United States Patent
Yamamoto

(10) Patent No.: US 12,157,454 B2
(45) Date of Patent: Dec. 3, 2024

(54) BRAKING CONTROL DEVICE

(71) Applicant: ADVICS CO., LTD., Kariya (JP)

(72) Inventor: Yusaku Yamamoto, Kariya (JP)

(73) Assignee: ADVICS CO., LTD., Kariya (JP)

( * ) Notice: Subject to any disclaimer, the term of this patent is extended or adjusted under 35 U.S.C. 154(b) by 199 days.

(21) Appl. No.: 17/758,900

(22) PCT Filed: Jan. 22, 2021

(86) PCT No.: PCT/JP2021/002246
§ 371 (c)(1),
(2) Date: Dec. 19, 2022

(87) PCT Pub. No.: WO2021/149797
PCT Pub. Date: Jul. 29, 2021

(65) Prior Publication Data
US 2023/0219542 A1      Jul. 13, 2023

(30) Foreign Application Priority Data

Jan. 24, 2020   (JP) .................................. 2020-009596

(51) Int. Cl.
*B60T 8/1755*      (2006.01)
*B60L 7/26*          (2006.01)
(Continued)

(52) U.S. Cl.
CPC .............. *B60T 8/1755* (2013.01); *B60L 7/26* (2013.01); *B60T 8/1766* (2013.01);
(Continued)

(58) Field of Classification Search
CPC ................. B60T 8/1755; B60T 8/1766; B60T 2270/604; B60L 7/26; B60L 2240/42;
(Continued)

(56) References Cited

U.S. PATENT DOCUMENTS 7,575,287 B2 *   8/2009   Matsuura ........ B60W 30/18127
                                                                701/70
10,336,195 B2 *  7/2019   Suzuki ................ B60L 15/2009
(Continued)

FOREIGN PATENT DOCUMENTS

CN      108137012 A   *  6/2018  .......... B60L 15/2009
JP      2008295266 A  * 12/2008
(Continued)

OTHER PUBLICATIONS

International Search Report (PCT/ISA/210) with English translation and Written Opinion (PCT/ISA/237) mailed on Mar. 16, 2021, by the Japanese Patent Office as the International Searching Authority for International Application No. PCT/JP 2021/002246.

*Primary Examiner* — B M M Hannan
(74) *Attorney, Agent, or Firm* — BUCHANAN, INGERSOLL & ROONEY PC

(57) ABSTRACT

The braking control device includes a control amount derivation unit that derives a target vehicle braking force representing a target value of a vehicle braking force applied, and a braking control unit that controls a regenerative braking device and a frictional braking device based on the target vehicle braking force. When the target vehicle braking force is increased, the braking control unit executes a braking force application process of increasing the frictional braking force applied to the wheel so that such frictional braking force becomes larger than the regenerative braking force applied to the wheel. When the target vehicle braking force is increased, the braking control unit executes a switching process of switching at least a part of the frictional braking force applied to the wheel to the regenerative braking force to increase the regenerative braking force applied to the wheel after execution of the braking force application process.

12 Claims, 7 Drawing Sheets

(51) Int. Cl.
*B60T 8/1766* (2006.01)
*B60W 10/188* (2012.01)
*B60W 20/14* (2016.01)
*B60W 30/04* (2006.01)
*B60W 30/18* (2012.01)
*B60W 40/107* (2012.01)
*B60W 40/11* (2012.01)

(52) U.S. Cl.
CPC .......... *B60W 10/188* (2013.01); *B60W 20/14* (2016.01); *B60W 30/04* (2013.01); *B60W 30/18127* (2013.01); *B60W 40/107* (2013.01); *B60W 40/11* (2013.01); B60L 2240/42 (2013.01); B60T 2270/604 (2013.01); B60W 2030/041 (2013.01); B60W 2520/16 (2013.01); B60W 2710/182 (2013.01)

(58) Field of Classification Search
CPC .... B60W 10/188; B60W 20/14; B60W 30/04; B60W 30/18127; B60W 40/107; B60W 40/11; B60W 2030/041; B60W 2520/16; B60W 2710/182; B60W 10/00; B60W 10/184; B60W 10/08; Y02T 10/72
USPC .......................................................... 701/70
See application file for complete search history.

(56) References Cited

U.S. PATENT DOCUMENTS

| | | | | |
|---|---|---|---|---|
| 10,358,037 | B2* | 7/2019 | Ueno | B60T 13/745 |
| 2002/0180266 | A1* | 12/2002 | Hara | B60W 30/18109 903/918 |
| 2005/0269875 | A1* | 12/2005 | Maki | B60T 8/38 303/152 |
| 2007/0018499 | A1* | 1/2007 | Kokubo | B60L 7/14 303/151 |
| 2007/0046099 | A1* | 3/2007 | Matsuura | B60T 8/17616 303/152 |
| 2007/0228821 | A1* | 10/2007 | Maki | B60W 10/184 303/151 |
| 2012/0074767 | A1* | 3/2012 | Nishio | B60L 50/16 303/3 |
| 2014/0195133 | A1* | 7/2014 | Kato | B60W 20/00 701/78 |
| 2015/0123457 | A1* | 5/2015 | Naito | B60L 50/16 303/3 |
| 2016/0152143 | A1* | 6/2016 | Nakamura | B60W 10/08 701/22 |
| 2016/0200200 | A1* | 7/2016 | Nakata | B60L 15/2009 303/3 |
| 2016/0264002 | A1* | 9/2016 | Suda | B60T 8/17616 |
| 2017/0021731 | A1* | 1/2017 | Suzuki | B60T 8/1755 |
| 2020/0017082 | A1* | 1/2020 | Takahashi | B60T 13/586 |
| 2020/0307386 | A1* | 10/2020 | Takahashi | B60T 1/10 |

FOREIGN PATENT DOCUMENTS

| | | | | |
|---|---|---|---|---|
| JP | 2013180670 A | | 9/2013 | |
| JP | 2015085792 A | * | 5/2015 | ............... B60L 7/26 |
| JP | 2015196474 A | * | 11/2019 | |
| WO | WO-2014167643 A1 | * | 10/2014 | ......... B60L 15/2009 |
| WO | WO-2017047231 A1 | * | 3/2017 | ......... B60L 15/2009 |

* cited by examiner

BRAKING CONTROL DEVICE

TECHNICAL FIELD

The present disclosure relates to a braking control device for a vehicle.

BACKGROUND ART

When at least one of a frictional braking force and a regenerative braking force is applied to the front wheel of the vehicle, an anti-dive force is generated in the vehicle as a force for suppressing the pitching motion of the vehicle. When at least one of a frictional braking force and a regenerative braking force is applied to the rear wheel of the vehicle, an anti-lift force is generated in the vehicle as a force for suppressing the pitching motion of the vehicle. A force that suppresses the pitching motion of the vehicle by applying a braking force to the wheel, such as an anti-dive force or an anti-lift force, is referred to as a pitching suppression force. Regarding such a pitching suppression force, as described in Patent Literature 1, it is known that the pitching suppression force generated in the vehicle when the frictional braking force is applied to the wheel is larger than the pitching suppression force generated in the vehicle when the regenerative braking force is applied to the wheel.

The braking control device disclosed in Patent Literature 1 determines a regenerative distribution ratio, which is a ratio of a regenerative braking force with respect to a braking force applied to a vehicle, based on driving operation information such as a braking operation amount and a steering amount by a driver, and adjusts the regenerative braking force and the frictional braking force according to the determined regenerative distribution ratio.

CITATIONS LIST

Patent Literature

Patent Literature 1: Japanese Unexamined Patent Application Publication No. 2013-180670

SUMMARY

Technical Problems

In the braking control device as described above, when the regenerative distribution ratio determined based on the driving operation information is small, the frictional braking force applied to the wheel increases. As a result, the pitching motion of the vehicle can be suppressed by an amount the pitching suppression force generated in the vehicle increases. However, in this case, the regenerative braking force applied to the wheels becomes small, and hence the energy recovery efficiency using regeneration at the time of vehicle braking becomes low. On the other hand, when the regenerative distribution ratio determined based on the driving operation information is large, the regenerative braking force applied to the wheels increases, so that the energy recovery efficiency using regeneration at the time of vehicle braking can be increased, but the frictional braking force applied to the wheels is reduced and the pitching suppression force generated in the vehicle reduces. For this reason, the pitching motion of the vehicle may not be sufficiently suppressed.

Therefore, in a vehicle where cooperative control of the frictional braking force and the regenerative braking force can be performed, it is required that both suppression of the pitching motion of the vehicle at the time of vehicle braking and improvement of energy recovery efficiency using regeneration are achieved.

Solutions to Problems

A braking control device for solving the above problem relates to a braking control device applied to a vehicle including a regenerative braking device that adjusts a regenerative braking force applied to a wheel of the vehicle and a frictional braking device that adjusts a frictional braking force applied to the wheel, the braking control device including a control amount derivation unit that derives a target vehicle braking force that is a target value of a braking force applied to the vehicle; and a braking control unit that controls the regenerative braking device and the frictional braking device based on the target vehicle braking force, where the braking control unit executes a braking force application process of increasing the frictional braking force applied to the wheel so that the frictional braking force applied to the wheel becomes larger than the regenerative braking force applied to the wheel when the target vehicle braking force is increased, and a switching process of increasing the regenerative braking force applied to the wheel by switching at least a part of the frictional braking force applied to the wheel to the regenerative braking force after the execution of the braking force application process.

The pitching suppression force, which is the force for suppressing the pitching motion of the vehicle, can be made larger in a case where the frictional braking force is applied to the wheel than in a case where the regenerative braking force is applied to the wheel. Therefore, according to the above configuration, when the target vehicle braking force is increased, the frictional braking force applied to the wheel is made larger than the regenerative braking force applied to the wheel by the execution of the braking force application process. Thus, the pitching motion of the vehicle is suppressed as compared with a case where the regenerative braking force applied to the wheel is made larger than the frictional braking force applied to the wheel. After the pitching motion of the vehicle is suppressed by the execution of the braking force application process, the regenerative braking force applied to the wheel is increased by switching at least a part of the frictional braking force applied to the wheel with the regenerative braking force by the execution of the switching process. As a result, the energy recovery efficiency using regeneration at the time of vehicle braking can be increased as compared with a case where the switching process is not executed.

That is, according to the above configuration, it is possible to achieve both suppression of the pitching motion of the vehicle at the time of vehicle braking and improvement of energy recovery efficiency using regeneration.

DESCRIPTION OF EMBODIMENTS

One embodiment of a braking control device will be described with reference to FIGS. 1 to 7.

Figure 1:
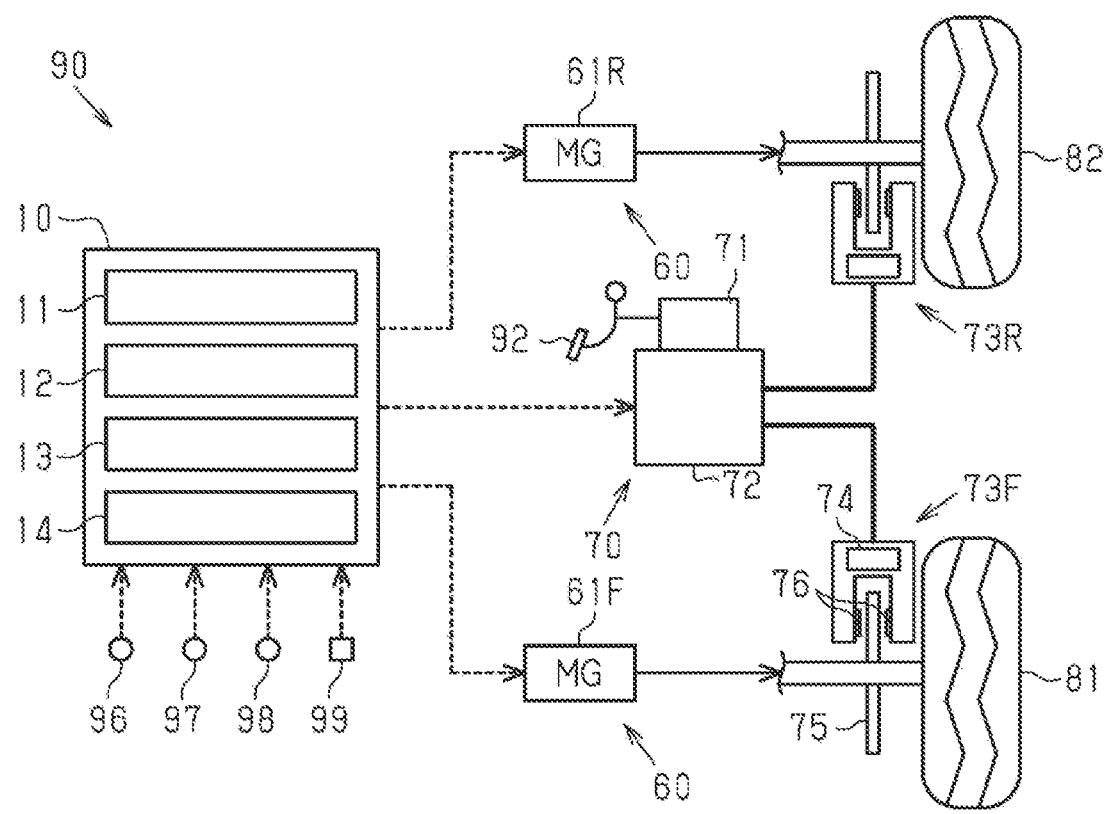
FIG. 1 is a schematic diagram illustrating a braking control device according to an embodiment and a vehicle to which the braking control device is applied.

FIG. 1 illustrates a braking control device 10 of the present embodiment and a vehicle 90 on which the braking control device 10 is mounted.

The vehicle 90 includes a friction braking mechanism 73F for the front wheel 81 and a friction braking mechanism 73R for the rear wheel 82. In the friction braking mechanism 73F, as the hydraulic pressure in a wheel cylinder 74 becomes higher, a friction material 76 is strongly pressed against a rotating body 75 that rotates integrally with the front wheel 81 corresponding to the friction braking mechanism 73F. A braking force is applied to the front wheel 81 by pressing the friction material 76 against the rotating body 75. The friction braking mechanism 73R for the rear wheel 82 is configured similarly to the friction braking mechanism 73F for the front wheel 81. Therefore, a braking force is applied to the rear wheel 82 by the friction braking mechanism 73R for the rear wheel 82.

Hereinafter, the braking force applied to the front wheel 81 by the actuation of the friction braking mechanism 73F is referred to as "front wheel frictional braking force BFPf", and the braking force applied to the rear wheel 82 by the actuation of the friction braking mechanism 73R is referred to as "rear wheel frictional braking force BFPr".

The vehicle 90 includes a frictional braking device 70 that adjusts the front wheel frictional braking force BFPf and the rear wheel frictional braking force BFPr by controlling the hydraulic pressure in the wheel cylinder 74. The frictional braking device 70 includes a hydraulic pressure generation device 71 and a braking actuator 72. When a braking operation member 92 such as a brake pedal is operated by the driver, the hydraulic pressure generation device 71 generates the hydraulic pressure according to the operation amount. When the braking operation member 92 is operated by the driver, the brake fluid of an amount corresponding to the hydraulic pressure generated by the hydraulic pressure generation device 71 is supplied into the wheel cylinder 74 via the braking actuator 72.

The braking actuator 72 can individually adjust the front wheel frictional braking force BFPf and the rear wheel frictional braking force BFPr by individually controlling the hydraulic pressure in each wheel cylinder 74. Furthermore, the braking actuator 72 can also individually adjust the front wheel frictional braking force BFPf and the rear wheel frictional braking force BFPr regardless of the operation amount of the braking operation member 92 by being controlled by the braking control device 10.

The vehicle 90 includes a motor generator 61F for the front wheel 81 and a motor generator 61R for the rear wheel 82. The vehicle 90 includes a power control unit including an inverter and a converter, and a battery that exchanges power with each of the motor generators 61F and 61R through the power control unit. By causing the motor generator 61F to function as an electric motor, a driving force is transmitted from the motor generator 61F to the front wheel 81. On the other hand, by causing the motor generator 61F to function as a power generator, a braking force corresponding to the power generation amount per unit time of the motor generator 61F is applied to the front wheel 81, and the generated electricity is accumulated in the battery. Similarly, by causing the motor generator 61R to function as an electric motor, the driving force is transmitted from the motor generator 61R to the rear wheel 82. On the other hand, by causing the motor generator 61R to function as a power generator, a braking force corresponding to the power generation amount per unit time of the motor generator 61R is applied to the rear wheel 82, and the generated electricity is accumulated in the battery. The power generation amounts of the motor generator 61F and the motor generator 61R correspond to the amount of energy recovered using regeneration. That is, as the regenerative braking force becomes stronger or the regenerative braking time becomes longer, the power generation amounts of the motor generator 61F and the motor generator 61R increase, and more energy can be recovered.

Hereinafter, the braking force applied to the front wheel 81 by the power generation of the motor generator 61F for the front wheel 81 is referred to as "front wheel regenerative braking force BFRf", and the braking force applied to the rear wheel 82 by the power generation of the motor generator 61R for the rear wheel 82 is referred to as "rear wheel regenerative braking force BFRr". In the vehicle 90, the motor generators 61F and 61R constitute a regenerative braking device 60 that adjusts regenerative braking force applied to the wheels 81 and 82.

The vehicle 90 includes various sensors for detecting the state of the vehicle 90. The vehicle 90 includes a wheel speed sensor 96 that detects a wheel speed of each wheel of the vehicle 90 as an example of various sensors. The wheel speed sensor 96 is provided on each wheel. The vehicle 90 includes a stroke sensor 97 that detects the operation amount of the braking operation member 92. The vehicle 90 includes a pitch rate sensor 98 that detects a pitch rate of the vehicle 90.

In addition, the vehicle 90 includes a surroundings monitoring device 99 for acquiring information on the periphery of the vehicle 90. The surroundings monitoring device 99 includes, for example, an imaging device. An example of the surroundings monitoring device 99 may include a detection device using radar or laser light.

As illustrated in FIG. 1, detection signals from various sensors are input to the braking control device 10. The information obtained by the surroundings monitoring device 99 is also input to the braking control device 10.

The braking control device 10 may have any of the following configurations (a) to (c). (a) One or more processors that executes various processes according to a computer program is provided. The processor includes a CPU and memories such as a RAM and a ROM. The memory stores a program code or a command configured to cause the CPU to execute processes. The memory, that is, the computer readable medium, includes any available medium that can be accessed by a general-purpose or dedicated computer. (b) One or more dedicated hardware circuits that executes various processes are provided. The dedicated hardware circuit is, for example, an application specific integrated circuit (ASIC), a field programmable gate array (FPGA), or the like. (c) A processor that executes some of the various processes in accordance with a computer program, and a dedicated hardware circuit that executes the remaining processes of the various processes are provided.

The braking control device 10 includes, as functional units, a vehicle motion determination unit 11, a distribution ratio derivation unit 12, a braking control unit 13, and a control amount derivation unit 14.

The control amount derivation unit 14 derives a detection value, a target value, and the like related to the control of the regenerative braking device 60 and the frictional braking device 70. For example, the control amount derivation unit 14 derives the wheel speed at each wheel of the vehicle 90 based on the detection signal from the wheel speed sensor 96. The control amount derivation unit 14 derives the vehicle speed VS of the vehicle 90 based on each wheel speed. The control amount derivation unit 14 derives the front-rear acceleration Gx of the vehicle 90 based on the vehicle speed VS. The control amount derivation unit 14 derives the operation amount of the braking operation member 92 based on the detection signal from the stroke sensor 97. The control amount derivation unit 14 derives the pitch rate Pr of the vehicle 90 based on the detection signal from the pitch rate sensor 98. The control amount derivation unit 14 derives the target vehicle braking force BFT as a target value of the braking force applied to the vehicle 90 based on the operation amount of the braking operation member 92.

The braking control unit 13 adjusts the braking force applied to each wheel by controlling the regenerative braking device 60 and the frictional braking device 70 based on the target vehicle braking force BFT, the regeneration ratio α, the regeneration front wheel ratio β, and the friction front wheel ratio γ to be described later.

The distribution ratio derivation unit 12 derives a distribution ratio for adjusting the braking force to be applied to each wheel by the control of the regenerative braking device 60 and the frictional braking device 70 by the braking control unit 13. The distribution ratio includes the regeneration ratio α, the regeneration front wheel ratio β, and the friction front wheel ratio γ.

The regeneration ratio α indicates a ratio of the regenerative braking force BFR applied to the vehicle 90 in the target vehicle braking force BFT. The regenerative braking force BFR is the sum of the regenerative braking forces applied to each of the wheels. The sum of the frictional braking forces applied to each of the wheels is referred to as a frictional braking force BFP. The regeneration ratio α is a value of "0" to "1". When the regeneration ratio α is "0", the frictional braking device 70 is controlled by the braking control unit 13 such that the target vehicle braking force BFT is satisfied only by the frictional braking force BFP. When the regeneration ratio α is "1", the regenerative braking device 60 is controlled by the braking control unit 13 such that the target vehicle braking force BFT is satisfied only by the regenerative braking force BFR. When the regeneration ratio α is larger than "0" and smaller than "1", the frictional braking device 70 and the regenerative braking device 60 are controlled by the braking control unit 13 such that the sum of the frictional braking force BFP and the regenerative braking force BFR becomes the target vehicle braking force BFT.

The regeneration front wheel ratio β indicates a ratio of the front wheel regenerative braking force BFRf when the regenerative braking force BFR is distributed to the front wheel regenerative braking force BFRf and the rear wheel regenerative braking force BFRr. The regeneration front wheel ratio β is a value of "0" to "1". When the regeneration front wheel ratio β is "0", the regenerative braking device 60 is controlled by the braking control unit 13 such that the magnitude of the rear wheel regenerative braking force BFRr becomes equal to the magnitude of the regenerative braking force BFR. When the regeneration front wheel ratio β is "1", the regenerative braking device 60 is controlled by the braking control unit 13 such that the magnitude of the front wheel regenerative braking force BFRf becomes equal to the magnitude of the regenerative braking force BFR. When the regeneration front wheel ratio β is larger than "0" and smaller than "1", the regenerative braking device 60 is controlled by the braking control unit 13 such that the sum of the front wheel regenerative braking force BFRf and the rear wheel regenerative braking force BFRr becomes the regenerative braking force BFR.

The friction front wheel ratio γ indicates a ratio of the front wheel frictional braking force BFPf when the frictional braking force BFP is distributed to the front wheel frictional braking force BFPf and the rear wheel frictional braking force BFPr. The friction front wheel ratio γ is a value of "0" to "1". When the friction front wheel ratio γ is "0", the frictional braking device 70 is controlled such that the magnitude of the rear wheel frictional braking force BFPr becomes equal to the magnitude of the frictional braking force BFP. When the friction front wheel ratio γ is "1", the frictional braking device 70 is controlled such that the magnitude of the front wheel frictional braking force BFPf becomes equal to the magnitude of the frictional braking force BFP. When the friction front wheel ratio γ is larger than "0" and smaller than "1", the frictional braking device 70 is controlled such that the sum of the front wheel frictional braking force BFPf and the rear wheel frictional braking force BFPr becomes the frictional braking force BFP.

The distribution ratio derivation unit 12 varies the distribution ratio in accordance with the state of the vehicle 90 at the time of vehicle braking so as to suppress the pitching motion of the vehicle 90. Details of a mode of deriving the distribution ratio by the distribution ratio derivation unit 12 will be described later.

The vehicle motion determination unit 11 determines whether or not the posture change amount is greater than or equal to a prescribed determination value based on an index related to the pitching motion of the vehicle 90, with the change amount of the posture of the vehicle 90, having the posture of the vehicle 90 before the start of the increase in the target vehicle braking force BFT as a reference, as a posture change amount. When determining that the posture change amount becomes greater than or equal to the determination value, the vehicle motion determination unit 11 outputs the posture control priority determination. When determining that the posture change amount becomes less than the determination value, the vehicle motion determination unit 11 stops the output of the posture control priority determination. The posture control priority determination is used when changing the mode of deriving the distribution ratio by the distribution ratio derivation unit 12.

The posture of the vehicle 90 can be expressed using, for example, a pitch angle and a pitching rate of the vehicle 90. When the posture of the vehicle 90 is the pitch angle, the posture change amount is a change amount of the pitch angle based on the pitch angle before the start of the increase in the target vehicle braking force BFT. When the posture of the vehicle 90 is the pitching rate, the posture change amount is a change amount of the pitching rate based on the pitching rate before the start of the increase in the target vehicle braking force BFT.

The index related to the pitching motion of the vehicle 90 is a value obtained by predicting the state of the vehicle 90 at the time of vehicle braking. For example, a predicted value of the front-rear acceleration of the vehicle 90, a predicted value of the jerk of the vehicle 90, a predicted value of the pitch angular velocity of the vehicle 90, a predicted value of the pitch angular acceleration of the vehicle 90, and the like are indices related to the pitching motion of the vehicle 90. For example, the vehicle motion determination unit 11 derives each predicted value based on the operation amount of the braking operation member 92. The vehicle motion determination unit 11 can also derive each predicted value based on the information acquired by the surroundings monitoring device 99. The vehicle motion determination unit 11 stores a threshold value corresponding to each predicted value. Each threshold value is a value derived in advance through experiments or the like. When at least one of the predicted values exceeds the threshold value, the vehicle motion determination unit 11 determines that the posture change amount becomes greater than or equal to the determination value, and outputs the posture control priority determination. That is, the vehicle motion determination unit 11 outputs the posture control priority determination when it is predicted that the posture of the vehicle 90 greatly changes at the time of vehicle braking. For example, the posture control priority determination may be output when vehicle braking is started.

Here, a case where a predicted value of the front-rear acceleration of the vehicle 90 is acquired as an index related to the pitching motion is considered. The predicted value of the front-rear acceleration can be derived based on the operation amount of the braking operation member 92, the increasing speed of the operation amount, and the like. At the time of braking, the posture of the vehicle 90 tends to change greatly as the absolute value of the front-rear acceleration increases. Therefore, it can be estimated that the posture change amount increases as the absolute value of the predicted value of the front-rear acceleration increases. Thus, when the absolute value of the predicted value of the front-rear acceleration exceeds the threshold value, the vehicle motion determination unit 11 determines that the posture change amount becomes greater than or equal to the determination value, and outputs the posture control priority determination.

A mode of deriving the distribution ratio by the distribution ratio derivation unit 12 will be described. First, the force acting on the vehicle 90 at the time of braking of the vehicle 90 will be described with reference to FIG. 2.

Figure 2:
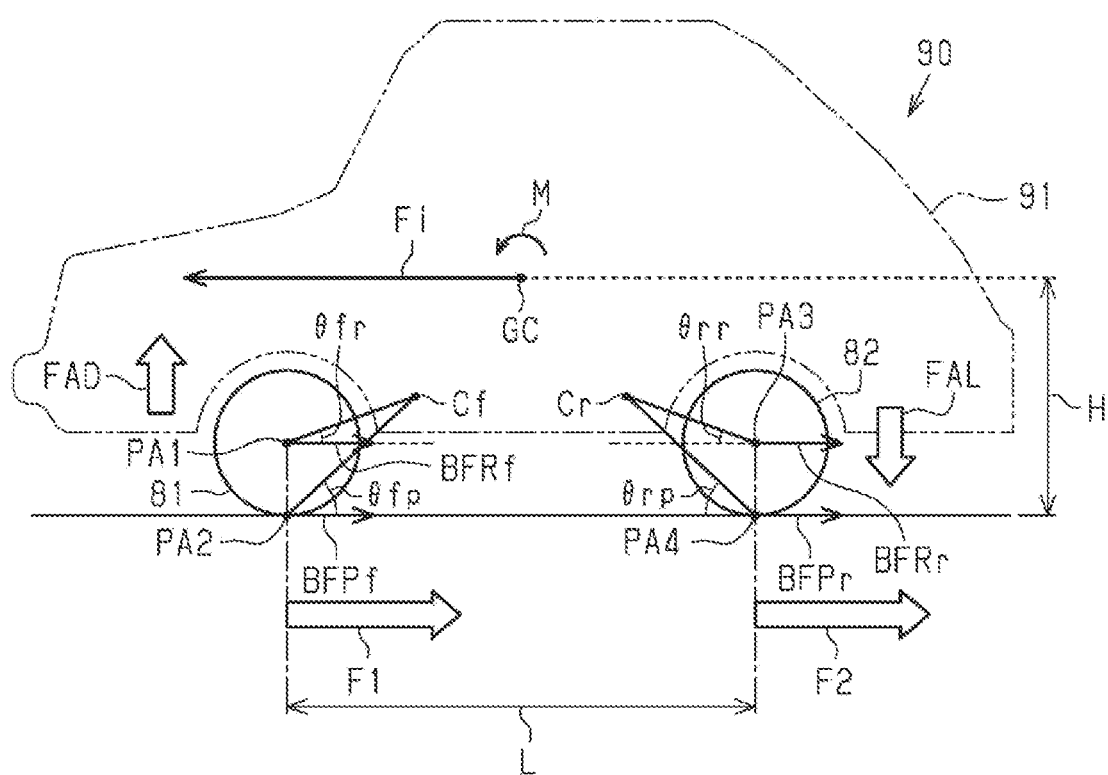
FIG. 2 is a schematic diagram for explaining a force acting on the vehicle at the time of vehicle braking.

FIG. 2 illustrates an inertia force Fi acting on the vehicle 90 at the time of braking, a front wheel braking force F1 which is all the braking force acting on the front wheel 81, and a rear wheel braking force F2 which is all the braking force acting on the rear wheel 82. The front wheel braking force F1 is the sum of the front wheel frictional braking force BFPf and the front wheel regenerative braking force BFRf. The rear wheel braking force F2 is the sum of the rear wheel frictional braking force BFPr and the rear wheel regenerative braking force BFRr. The front wheel frictional braking force BFPf, the front wheel regenerative braking force BFRf, the rear wheel frictional braking force BFPr, and the rear wheel regenerative braking force BFRr can be expressed as the following (Formula 1) to (Formula 4) using the regeneration ratio $\alpha$, the regeneration front wheel ratio $\beta$, and the friction front wheel ratio $\gamma$, where the sum of the front wheel braking force F1 and the rear wheel braking force F2 is the vehicle braking force F.

[Equation 1]

$$BFRf = \alpha\beta F \quad \text{(Formula 1)}$$

$$BFPf = (1-\alpha)\gamma F \quad \text{(Formula 2)}$$

$$BFRr = \alpha(1-\beta)F \quad \text{(Formula 3)}$$

$$BFPr = (1-\alpha)(1-\gamma)F \quad \text{(Formula 4)}$$

At the time of vehicle braking, a force for suppressing the front wheel 81 side of the vehicle body 91 of the vehicle 90 from sinking acts on the vehicle body 91 by the suspension for the front wheel 81. This force is referred to as an anti-dive force FAD. The anti-dive force FAD is a force that acts in a direction of displacing the front wheel 81 side of the vehicle body 91, that is, the front portion of the vehicle 90 toward a side away from the road surface. In FIG. 2, the anti-dive force FAD is indicated by an upward outlined arrow.

At the time of vehicle braking, a force for suppressing the rear wheel 82 side of the vehicle body 91 of the vehicle 90 from lifting acts on the vehicle body 91 by the suspension for the rear wheel 82. This force is referred to as an anti-lift force FAL. The anti-lift force FAL is a force that acts in a direction of displacing the rear wheel 82 side of the vehicle body 91, that is, the rear portion of the vehicle 90 toward the road surface. In FIG. 2, the anti-lift force FAL is indicated by a downward outlined arrow.

The anti-dive force FAD and the anti-lift force FAL are pitching suppression forces that suppress the pitching moment M.

In the suspension for the front wheel 81 and the suspension for the rear wheel 82 provided in the vehicle 90, the suspension geometry is set such that the anti-lift force FAL becomes larger than the anti-dive force FAD when the front wheel braking force F1 and the rear wheel braking force F2 have the same magnitude with each other. That is, in the present embodiment, the anti-lift force FAL corresponds to the "first force", and the anti-dive force FAD corresponds to the "second force". The rear wheel 82 corresponds to a "first wheel" which is a "wheel that generates the first force in the vehicle by applying the braking force". The front wheel 81 corresponds to a "second wheel" which is a "wheel that generates the second force in the vehicle by applying the braking force".

Here, the frictional braking force acts on the contact points between the wheels 81 and 82 and the road surface, while the regenerative braking force acts on the wheel centers of the wheels 81 and 82. FIG. 2 illustrates a first action point PA1 where the front wheel regenerative braking force BFRf acts, a second action point PA2 where the front wheel frictional braking force BFPf acts, a third action point PA3 where the rear wheel regenerative braking force BFRr acts, and a fourth action point PA4 where the rear wheel frictional braking force BFPr acts.

Assuming that the instantaneous rotation center of the front wheel 81 is the front wheel rotation center Cf, a first angle $\theta fr$ that is an angle formed by a straight line connecting the first action point PA1 and the front wheel rotation center Cf and the road surface is smaller than a second angle $\theta fp$ that is an angle formed by a straight line connecting the second action point PA2 and the front wheel rotation center Cf and the road surface. Similarly, assuming that the instantaneous rotation center of the rear wheel 82 is the rear wheel rotation center Cr, a third angle $\theta rr$ that is an angle formed by a straight line connecting the third action point PA3 and the rear wheel rotation center Cr and the road surface is smaller than a fourth angle $\theta rp$ that is an angle formed by a straight line connecting the fourth action point PA4 and the rear wheel rotation center Cr and the road surface.

The anti-dive force FAD and the anti-lift force FAL can be expressed as the following (Formula 5) and (Formula 6)

using the above (Formula 1) to (Formula 4), the first angle θfr, the second angle θfp, the third angle θrr, and the fourth angle θrp.

[Equation 2]

$$FAD = \alpha\beta F \tan\theta fr + (1-\alpha)\gamma F \tan\theta fp \quad \text{(Formula 5)}$$

$$FAL = \alpha(1-\beta) F \tan\theta rr + (1-\alpha)(1-\gamma) F \tan\theta rp \quad \text{(Formula 6)}$$

As illustrated in FIG. 2, since the second angle θfp is larger than the first angle θfr, the front wheel frictional braking force BFPf contributes more to the anti-dive force FAD than the front wheel regenerative braking force BFRf. Similarly, since the fourth angle θrp is larger than the third angle θrr, the rear wheel frictional braking force BFPr contributes more to the anti-lift force FAL than the rear wheel regenerative braking force BFRr.

FIG. 2 illustrates a vehicle gravitational center GC of the vehicle 90. FIG. 2 illustrates the pitching moment M generated in the vehicle body 91 at the time of vehicle braking. The pitching moment M is a force that tilts the vehicle body 91 forward. The pitching moment M can be calculated based on the inertia force Fi, the gravitational center height H, which is the distance from the vehicle gravitational center GC to the road surface, and the wheelbase L, which is the distance between the wheel center of the front wheel 81 and the wheel center of the rear wheel 82.

The anti-dive force FAD and the anti-lift force FAL for suppressing the pitching motion are values that change by the regeneration ratio α, the regeneration front wheel ratio β, and the friction front wheel ratio γ as shown in (Formula 5) and (Formula 6) above. Since the anti-dive force FAD and the anti-lift force FAL generated in the vehicle 90 can be adjusted by adjusting the regeneration ratio α, the regeneration front wheel ratio β, and the friction front wheel ratio γ, the pitching motion of the vehicle 90 can be suppressed by setting the regeneration ratio α, the regeneration front wheel ratio β, and the friction front wheel ratio γ according to the pitching moment M.

The distribution ratio derivation unit 12 adjusts the regeneration front wheel ratio β and the friction front wheel ratio γ according to the pitching moment M so as to suppress the pitching motion of the vehicle 90 during braking.

The anti-lift force FAL has higher sensitivity to the magnitude of the braking force than the anti-dive force FAD. Therefore, in order to efficiently generate the anti-lift force FAL, the regeneration front wheel ratio β and the friction front wheel ratio γ are preferably decreased so that the rear wheel braking force F2 increases. However, when the rear wheel braking force F2 is excessively increased with respect to the front wheel braking force F1, there is a possibility that an event in which a predetermined deceleration slip occurs in the rear wheel 82 although the predetermined deceleration slip does not occur in the front wheel 81, that is, the rear wheel preceding lock may occur. Therefore, in order to ensure the stability of the behavior of the vehicle 90 at the time of braking, the regeneration front wheel ratio β and the friction front wheel ratio γ may be adjusted so that such an event does not occur.

Figure 3:
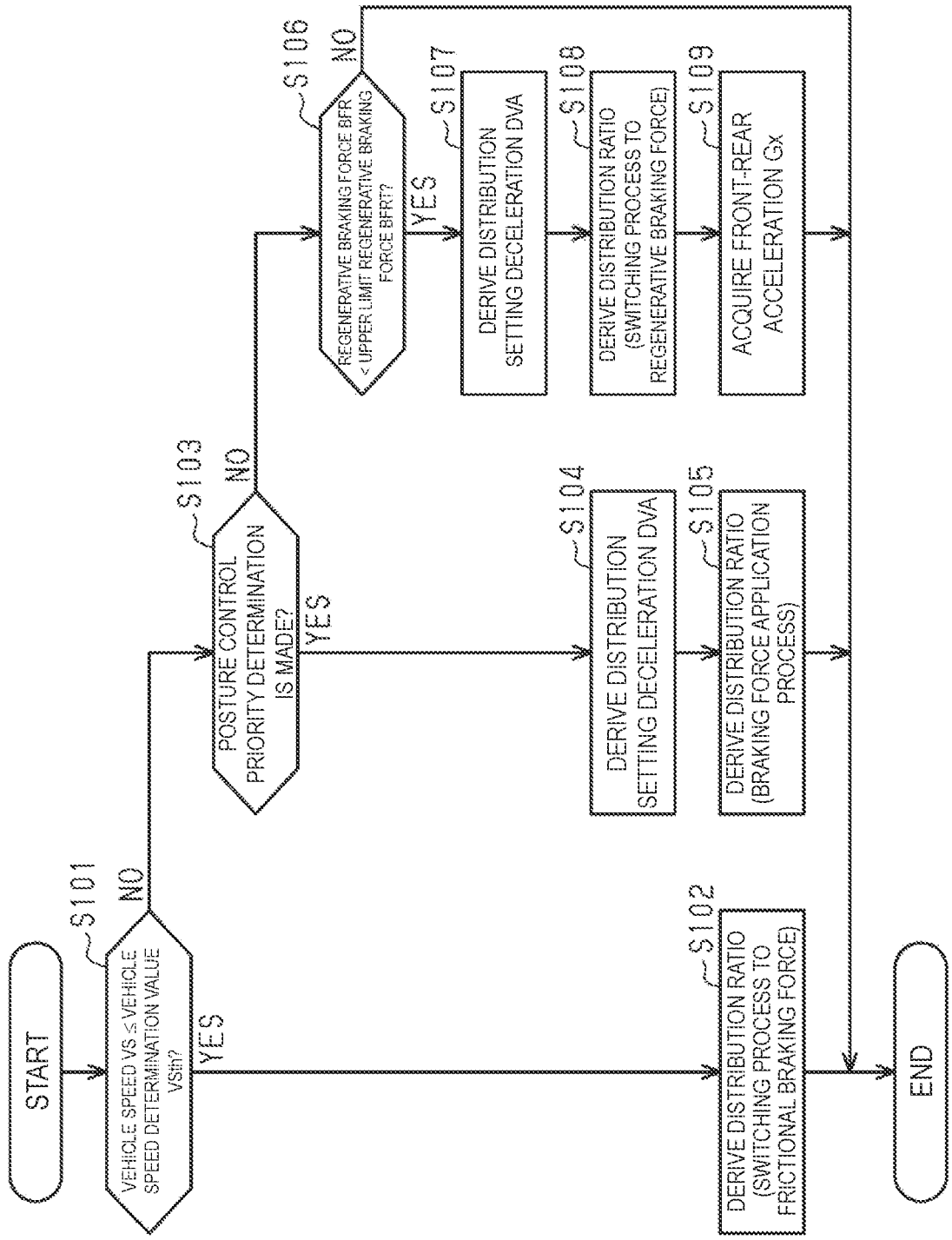
FIG. 3 is a flowchart showing a flow of processes executed by the braking control device of the embodiment.

Next, a process for adjusting the regeneration ratio α will be described with reference to FIG. 3. FIG. 3 illustrates a flow of processes executed by the braking control device 10. The braking control device 10 repeatedly executes this processing routine until the vehicle 90 stops during braking of the vehicle 90.

When the present processing routine is started, the braking control device 10 first determines whether or not the vehicle speed VS is less than or equal to the vehicle speed determination value VSth in step S101. The vehicle speed determination value VSth is a threshold value for determining whether it is immediately before the vehicle 90 stops. When the vehicle speed VS is less than or equal to the vehicle speed determination value VSth, the rotation speeds of the motor generator 61F and the motor generator 61R are lowered, and the controllability of the regenerative braking force may be significantly lowered. Therefore, the vehicle speed determination value VSth can also be said to be a threshold value for determining the start timing of the so-called low-speed switching control. When the vehicle speed VS is less than or equal to the vehicle speed determination value VSth (S101: YES), the braking control device 10 proceeds the process to step S102.

In step S102, the braking control device 10 causes the distribution ratio derivation unit 12 to derive the distribution ratio. Here, the braking control device 10 causes the distribution ratio derivation unit 12 to change the deriving mode of the distribution ratio so as to gradually decrease the regeneration ratio α toward "0". Then, the braking control device 10 terminates the present processing routine.

When the regeneration ratio α is decreased in the process of step S102, the braking force applied to the vehicle 90 is switched from the regenerative braking force to the frictional braking force by the control of the regenerative braking device 60 and the frictional braking device 70 by the braking control unit 13. As a result, the frictional braking force is increased.

When the vehicle speed VS is greater than the vehicle speed determination value VSth in the process of step S101 (S101: NO), the braking control device 10 proceeds the process to step S103.

In step S103, the braking control device 10 determines whether or not the posture control priority determination is output by the vehicle motion determination unit 11. When the posture control priority determination is made (S103: YES), the braking control device 10 proceed the process to step S104.

In step S104, the braking control device 10 derives the distribution setting deceleration DVA. The braking control device 10 uses the target front-rear acceleration GxT of the vehicle 90 that can be derived from the operation amount of the braking operation member 92 to derive a value obtained by subtracting the stored acceleration Gxb from the target front-rear acceleration GxT as the distribution setting deceleration DVA. For example, the target front-rear acceleration GxT is derived such that the absolute value of the target front-rear acceleration GxT increases as the operation amount of the braking operation member 92 increases. The stored acceleration Gxb is a value stored by the process of step S109 described later. When the stored acceleration Gxb is not stored, the value of the target front-rear acceleration GxT becomes the distribution setting deceleration DVA. Of course, when deriving as the distribution setting deceleration DVA as described above, positive/negative matching between the value obtained by subtracting the stored acceleration Gxb from the target front-rear acceleration GxT and the target front-rear acceleration GxT, and the distribution setting deceleration DVA is also appropriately processed according to the calculation process by the braking control device 10. Subsequently, the braking control device 10 proceeds the process to step S105.

In step S105, the braking control device 10 causes the distribution ratio derivation unit 12 to derive the distribution ratio based on the distribution setting deceleration DVA. Here, the braking control device 10 causes the distribution ratio derivation unit 12 to change the deriving mode of the distribution ratio so as to hold the regeneration ratio α small. For example, the distribution ratio derivation unit 12 holds the regeneration ratio α at "0". Then, the braking control device 10 terminates the present processing routine.

When the regeneration ratio α is set in the process of step S105, the regenerative braking device 60 and the frictional braking device 70 are controlled by the braking control unit 13 based on the regeneration ratio α. When the regeneration ratio α is "0", the braking control unit 13 does not apply the regenerative braking force to the vehicle 90 but applies only the frictional braking force to the vehicle 90.

When the posture control priority determination is not made in the process of step S103 (S103: NO), the braking control device 10 proceeds the process to step S106. In step S106, the braking control device 10 determines whether or not the regenerative braking force BFR is smaller than an upper limit regenerative braking force BFRT. The lower value of the target vehicle braking force BFT and the limit regeneration value BFRL is set as the upper limit regenerative braking force BFRT. The limit regeneration value BFRL is the maximum value of the regenerative braking force that can be applied to the vehicle 90 by the two motor generators 61F and 61R when the available capacity of the battery in which the power generated by the motor generators 61F and 61R is charged is sufficiently secured. The limit regeneration value BFRL may be increased or decreased depending on the temperature of the battery or the like.

When the regenerative braking force BFR is greater than or equal to the upper limit regenerative braking force BFRT in the process of step S106 (S106: NO), the braking control device 10 terminates this processing routine. In this case, the regeneration ratio α derived at the time point when the process of step S106 is performed is held.

When the regenerative braking force BFR is smaller than the upper limit regenerative braking force BFRT in the process of step S106 (S106: YES), the braking control device 10 proceeds the process to step S107. In step S107, the braking control device 10 derives the distribution setting deceleration DVA similarly to the process of step S104. Subsequently, the braking control device 10 proceeds the process to step S108.

In step S108, the braking control device 10 causes the distribution ratio derivation unit 12 to derive the distribution ratio based on the distribution setting deceleration DVA. Here, the braking control device 10 causes the distribution ratio derivation unit 12 to change the deriving mode of the distribution ratio so as to increase the regeneration ratio α. When the braking control device 10 causes the distribution ratio derivation unit 12 to change the deriving mode of the distribution ratio, the process proceeds to step S109.

When the regeneration ratio α is increased in the process of step S108, the braking force applied to the vehicle 90 is switched from the frictional braking force to the regenerative braking force by the control of the regenerative braking device 60 and the frictional braking device 70 by the braking control unit 13.

In step S109, the braking control device 10 acquires the front-rear acceleration Gx after the process of step S108 and stores the front-rear acceleration Gx as the stored acceleration Gxb. Thereafter, the braking control device 10 terminates the present processing routine. The braking control device 10 erases the stored acceleration Gxb from the memory when the application of the braking force to the vehicle 90 is canceled.

When the regeneration ratio α is held small as in the process of step S105 in the processing routine illustrated in FIG. 3, the regenerative braking force BFR is less likely to increase and the frictional braking force BFP is likely to increase even if the target vehicle braking force BFT is increased. That is, the process in which the braking control unit 13 controls the regenerative braking device 60 and the frictional braking device 70 according to the distribution ratio derived by the process of step S105 corresponds to a "braking force application process of increasing frictional braking force applied to the wheel so that the frictional braking force applied to the wheel becomes larger than regenerative braking force applied to the wheel".

When the regeneration ratio α is gradually increased as in the process of step S108, the frictional braking force BFP is reduced while the regenerative braking force BFR is increased. That is, the process in which the braking control unit 13 controls the regenerative braking device 60 and the frictional braking device 70 according to the distribution ratio derived by the process of step S108 corresponds to a "switching process of switching at least a part of the frictional braking force applied to the wheel with the regenerative braking force to increase the regenerative braking force applied to the wheel after the execution of the braking force application process".

The process in which the braking control unit 13 controls the regenerative braking device 60 and the frictional braking device 70 according to the held regeneration ratio α when the regenerative braking force BFR is greater than or equal to the upper limit regenerative braking force BFRT in the process of step S106 corresponds to a "holding process of holding a ratio of a frictional braking force applied to the wheel of the target vehicle braking force and a ratio of a regenerative braking force applied to the wheel of the target vehicle braking force as a process to be performed after the execution of the switching process".

When the regeneration ratio α is gradually decreased toward "0" as in the process of step S102, the regenerative braking force BFR is reduced while the frictional braking force BFP is increased. That is, the process in which the braking control unit 13 controls the regenerative braking device 60 and the frictional braking device 70 according to the distribution ratio derived by the process of step S102 can be said as a "low-speed switching process of switching the regenerative braking force applied to the wheel with the frictional braking force to increase the frictional braking force applied to the wheel".

Operations and effects of the present embodiment will be described.

First, an example of a case where the target vehicle braking force BFT is less than or equal to the limit regeneration value BFRL will be described using FIGS. 4 and 5.

Figure 4:
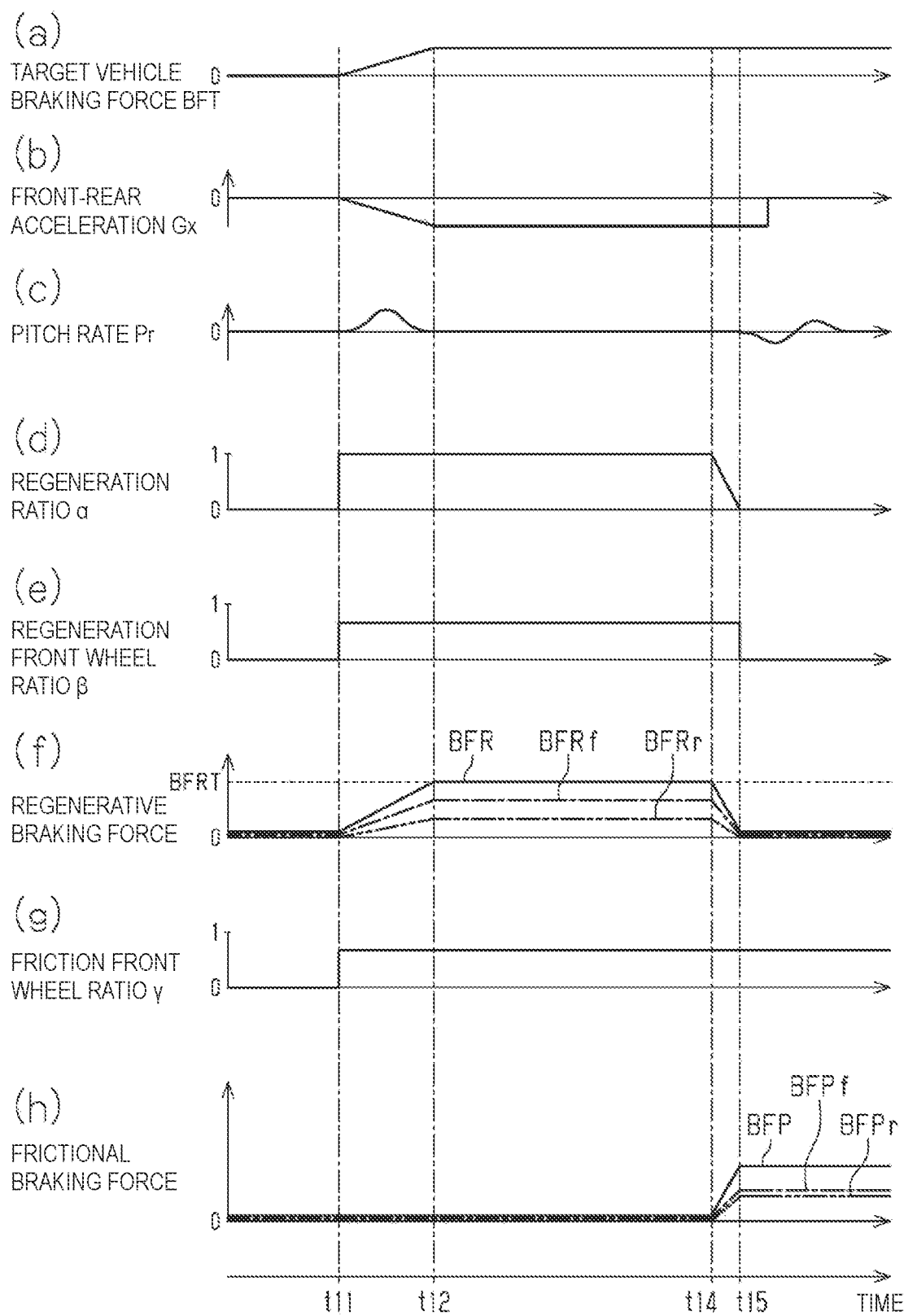
FIG. 4 is a timing chart showing a transition of a braking force applied to the vehicle by a braking control device of a comparative example.

FIG. 4 shows a transition of a braking force applied to the vehicle to which a braking control device of a comparative example is applied. In the braking control device of the comparative example shown in FIG. 4, the regeneration ratio α is "1" from the start of vehicle braking until the start of the low-speed switching control. In the example shown in FIG. 4, the target vehicle braking force BFT is increased from timing t11 to timing t12 as shown in FIG. 4(*a*). Then, after timing t12, the target vehicle braking force BFT is held. Since the vehicle decelerates after timing t11, the front-rear acceleration Gx has a negative value as illustrated in FIG. 4(*b*). After timing t15, the vehicle stops, and thus the front-rear acceleration Gx is "0". As illustrated in FIG. 4(*c*), the pitch rate Pr is a positive value between timing t11 when the braking is started and timing t12. After timing t15, the swing-back occurs with the stopping of the vehicle.

In the braking control device of the comparative example, as shown in FIG. 4(d), the regeneration ratio α is "1" at timing t11 when braking is started. Thus, the regenerative braking force BFR increases as illustrated in FIG. 4(f), while the frictional braking force BFP is not applied as illustrated in FIG. 4(h). As a result, in this case, the anti-dive force FAD originated from the front wheel regenerative braking force BFRf and the anti-lift force FAL originated from the rear wheel regenerative braking force BFRr can be generated in the vehicle. However, the anti-dive force FAD originated from the front wheel frictional braking force BFPf and the anti-lift force FAL originated from the rear wheel frictional braking force BFPr cannot be generated in the vehicle.

In a period from timing t14 to timing t15, as shown in FIGS. 4(f) and 4(h), the regenerative braking force BFR is switched to the frictional braking force BFP by the low-speed switching process.

As illustrated in FIGS. 4(e) and 4(g), the regeneration front wheel ratio β and the friction front wheel ratio γ are set such that the braking force on the front wheel side increases. Therefore, as illustrated in FIG. 4(f), the front wheel regenerative braking force BFRf indicated by the one-dot chain line is larger than the rear wheel regenerative braking force BFRr indicated by the two-dot chain line. Furthermore, as illustrated in FIG. 4(h), the front wheel frictional braking force BFPf indicated by the one-dot chain line is larger than the rear wheel frictional braking force BFPr indicated by the two-dot chain line.

Figure 5:
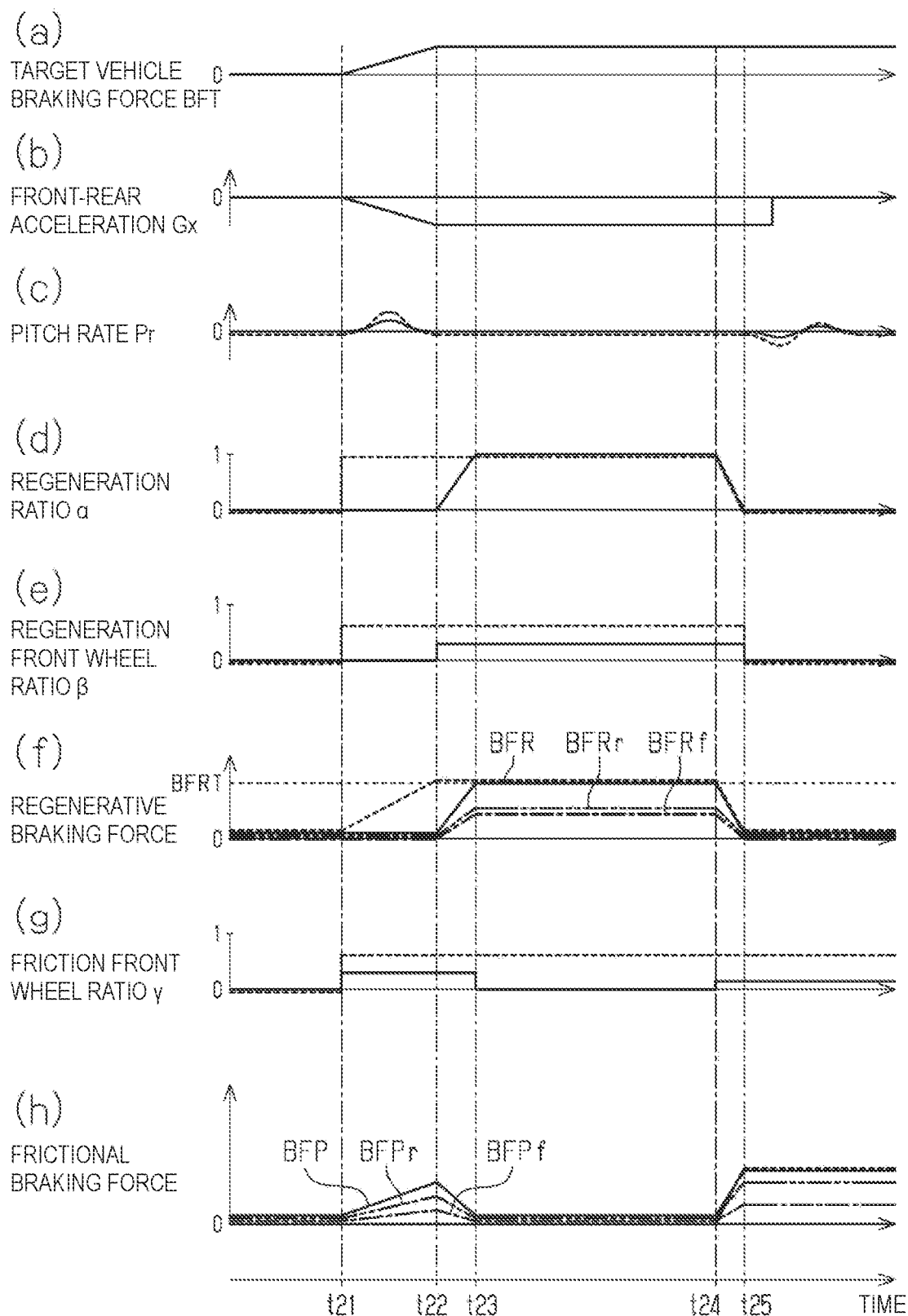
FIG. 5 is a timing chart showing a transition of a braking force applied to the vehicle by the braking control device of the embodiment.

FIG. 5 shows a transition of a braking force applied to the vehicle 90 to which the braking control device 10 of the present embodiment is applied. Note that, in FIGS. 5(c) to 5(h), transitions in the case of the comparative example illustrated in FIGS. 4(c) to 4(h) are indicated by broken lines.

As illustrated in FIG. 5(a), the target vehicle braking force BFT is increased from timing t21. Then, after timing t22, the target vehicle braking force BFT is held.

In the braking control device 10, at timing t21, determination is made that the posture change amount becomes greater than or equal to the determination value when the vehicle braking is started, and the posture control priority determination is output. Then, since the posture control priority determination is made (S103: YES), the regeneration ratio α is held small (S105). At this time, in the example illustrated in FIG. 5, "0" is set as the regeneration ratio α as indicated by a solid line in FIG. 5(d). When the regeneration ratio α is set in the process of step S105 in this manner, the braking force application process is executed.

As a result, as indicated by a solid line in FIG. 5(f), the regenerative braking force BFR is not applied to the vehicle in the period from timing t21 when the braking is started until timing t22. On the other hand, as indicated by a solid line in FIG. 5(h), the frictional braking force BFP is applied to the vehicle in this period. That is, according to the braking control device 10, the frictional braking force BFP is applied to the vehicle 90 instead of the regenerative braking force BFR applied at the start of braking as in the comparative example illustrated in FIG. 4. In the example shown in FIG. 5, as shown in FIG. 5(g), a value larger than "0" and smaller than "1" is set as the friction front wheel ratio γ. Thus, the frictional braking force is applied to both the front wheel 81 and the rear wheel 82. On the other hand, since the regeneration ratio α is "0", the regenerative braking force is not applied to either the front wheel 81 or the rear wheel 82. Therefore, although the anti-dive force FAD originated from the front wheel regenerative braking force BFRf and the anti-lift force FAL originated from the rear wheel regenerative braking force BFRr cannot be generated in the vehicle, the anti-dive force FAD originated from the front wheel frictional braking force BFPf and the anti-lift force FAL originated from the rear wheel frictional braking force BFPr can be generated in the vehicle.

The anti-lift force FAL originated from the rear wheel frictional braking force BFPr is larger than the anti-lift force FAL originated from the rear wheel regenerative braking force BFRr. The anti-dive force FAD originated from the front wheel frictional braking force BFPf is larger than the anti-dive force FAD originated from the front wheel regenerative braking force BFRf. That is, the pitching suppression force generated in the vehicle 90 can be increased by applying the frictional braking force BFP to the vehicle 90. When the posture control priority determination is made, that is, when the change amount of the posture of the vehicle 90 is predicted to be large, the pitching suppression force can be made larger than that in the case of the comparative example, and thus as indicated by a solid line in FIG. 5(c), the fluctuation in the pitch rate Pr can be suppressed to be smaller than that in the case of the comparative example indicated by a broken line. A sudden change in the posture of the vehicle thus can be suppressed.

As illustrated in FIGS. 5(e) and 5(g), the regeneration front wheel ratio β and the friction front wheel ratio γ are set such that the braking force on the rear wheel side increases. Therefore, as illustrated in FIG. 5(f), the rear wheel regenerative braking force BFRr indicated by the two-dot chain line is larger than the front wheel regenerative braking force BFRf indicated by the one-dot chain line. Furthermore, in the period from timing t21 to timing t22, the increasing speed of the rear wheel regenerative braking force BFRr is higher than the increasing speed of the front wheel regenerative braking force BFRf. Furthermore, as illustrated in FIG. 5(h), the rear wheel frictional braking force BFPr indicated by the two-dot chain line is larger than the front wheel frictional braking force BFPf indicated by the one-dot chain line. Moreover, in the period from timing t21 to timing t22, and the period from timing t24 to timing t25, the increasing speed of the rear wheel frictional braking force BFPr is higher than the increasing speed of the front wheel frictional braking force BFPf. Thus, the anti-lift force FAL generated in the vehicle 90 can be easily increased, and the pitching suppression force can be efficiently applied to the vehicle 90. That is, fluctuation in posture of the vehicle 90 can be easily suppressed.

In the example illustrated in FIG. 5, the output of the posture control priority determination is stopped at timing t22. That is, determination is made that the posture change amount is less than the determination value. Therefore, after timing t22, the posture control priority determination is not made (S103: NO) and the regenerative braking force BFR is smaller than the upper limit regenerative braking force BFRT (S106: YES), and thus the increase in the regeneration ratio α is started from timing t22 as indicated by the solid line in FIG. 5(d) (S108). That is, the switching process from the frictional braking force BFP to the regenerative braking force BFR is executed.

As a result, as indicated by a solid line in FIG. 5(h), the frictional braking force BFP is gradually reduced after timing t22. As indicated by a solid line in FIG. 5(f), the regenerative braking force BFR is gradually increased after timing t22. In the example illustrated in FIG. 5, the frictional braking force BFP is reduced to "0" at timing t23.

When the regenerative braking force BFR reaches the upper limit regenerative braking force BFRT at timing t23 (S106: NO), the switching process from the frictional braking force BFP to the regenerative braking force BFR is terminated, and the holding process is executed. Therefore, as indicated by a solid line in FIG. 5(d), the regeneration ratio α is held after timing t23.

As a result of executing the switching process from the frictional braking force BFP to the regenerative braking force BFR and the holding process, energy can be recovered using regeneration by applying the regenerative braking force BFR to the vehicle. When the posture control priority determination is not made, that is, when the change amount of the posture of the vehicle 90 is predicted to be small, the power generation amount of each of the motor generators 61F and 61R can be increased, so that the energy recovery efficiency using regeneration at the time of vehicle braking can be increased.

In a period from timing t24 to timing t25, as shown in FIGS. 5(f) and 5(h), the regenerative braking force BFR is switched to the frictional braking force BFP by the low-speed switching process. As a result, the anti-dive force FAD originated from the front wheel frictional braking force BFPf and the anti-lift force FAL originated from the rear wheel frictional braking force BFPr can be generated in the vehicle to appropriately suppress the pitch angle of the vehicle, so that the swing-back caused by the pitch angle returning to the angle at the time of stopping by the stopping of the vehicle becomes small.

Furthermore, the distribution ratio derivation unit 12 adjusts the regeneration front wheel ratio β and the friction front wheel ratio γ so as to suppress the pitching motion of the vehicle. At the time the switching process from the frictional braking force BFP to the regenerative braking force BFR is executed, the front wheel frictional braking force BFPf and the rear wheel frictional braking force BFPr are reduced, and the front wheel regenerative braking force BFRf and the rear wheel regenerative braking force BFRr are increased. As a result, the pitching suppression force, which is the sum of the anti-dive force FAD and the anti-lift force FAL, may change between before the start of the switching process and after the end of the switching process. Therefore, for example, the regeneration front wheel ratio β and the friction front wheel ratio γ may be adjusted so that the change amount of the pitching suppression force falls within the allowable range before the start of the switching process and after the end of the switching process. More specifically, for example, the regeneration front wheel ratio β and the friction front wheel ratio γ may be adjusted in a direction in which the braking force of the rear wheel 82, in which the generation amount of the pitching suppression force with respect to the braking force is large, increases before the start of the switching process. Thus, the posture change of the vehicle accompanying the execution of the switching process can be suppressed.

Similarly, even in the low-speed switching process which is the switching from the regenerative braking force BFR to the frictional braking force BFP, the regeneration front wheel ratio β and the friction front wheel ratio γ may be adjusted so that the change amount of the pitching suppression force falls within the allowable range before the start of the low-speed switching process and after the end of the low-speed switching process. More specifically, for example, the regeneration front wheel ratio β and the friction front wheel ratio γ may be adjusted in a direction in which the braking force of the rear wheel 82, in which the generation amount of the pitching suppression force with respect to the braking force is large, decreases before the start of the switching process. Thus, the posture change of the vehicle accompanying the execution of the low-speed switching process can be suppressed.

Furthermore, in the braking control device 10, the distribution setting deceleration DVA, which is a value obtained by subtracting the stored acceleration Gxb from the target front-rear acceleration GxT, is used when the distribution ratio is derived (S105 and S108). Therefore, for example, when the target vehicle braking force BFT is increased by an increase in the operation amount of the braking operation member 92 or the like in a period in which the target vehicle braking force BFT is held such as after timing t22, the distribution ratio is derived in consideration of the amount of increase in the target vehicle braking force BFT. As a result, the pitching motion of the vehicle 90 can be suppressed even when the target vehicle braking force BFT is further increased during vehicle braking.

Next, an example of a case where the target vehicle braking force BFT is larger than the limit regeneration value BFRL will be described using FIGS. 6 and 7.

Figure 6:
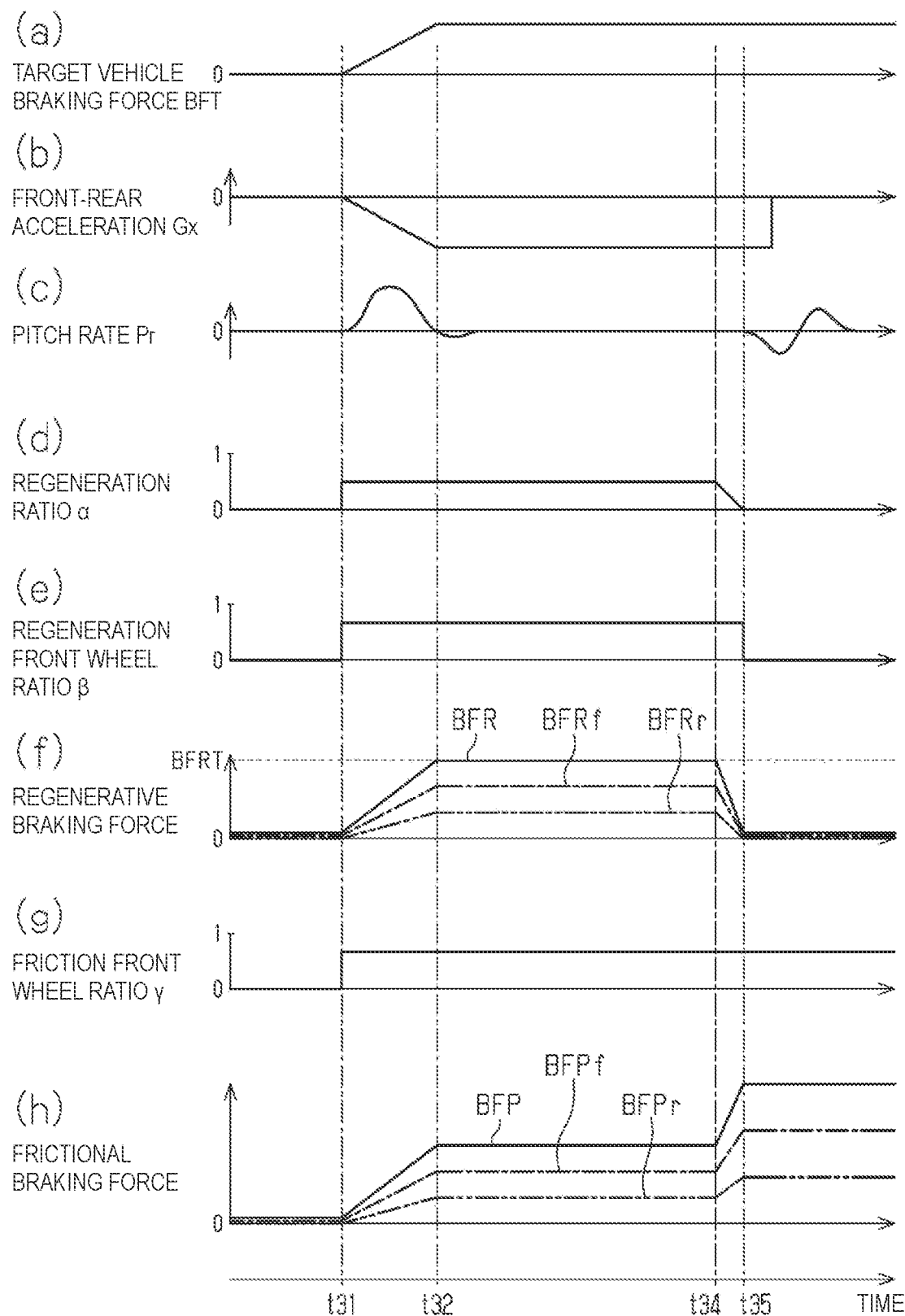
FIG. 6 is a timing chart showing a transition of a braking force applied to the vehicle by the braking control device of the comparative example.

FIG. 6 shows a transition of a braking force applied to the vehicle to which a braking control device of a comparative example is applied. In the braking control device of the comparative example shown in FIG. 6, the regeneration ratio α is held at a predetermined value larger than "0" and smaller than "1" from the start of vehicle braking until the start of the low-speed switching control.

In the example shown in FIG. 6, the target vehicle braking force BFT is increased from timing t31 to timing t32 as shown in FIG. 6(a). After timing t32, the target vehicle braking force BFT is held. As illustrated in FIGS. 6(f) and 6(h), the regenerative braking force BFR alone does not meet the target vehicle braking force BFT, and hence the frictional braking force BFP is applied in addition to the regenerative braking force BFR. In a period from timing t34 to timing t35, the regenerative braking force BFR is switched to the frictional braking force BFP by the low-speed switching process, and the frictional braking force BFP is further increased.

Figure 7:
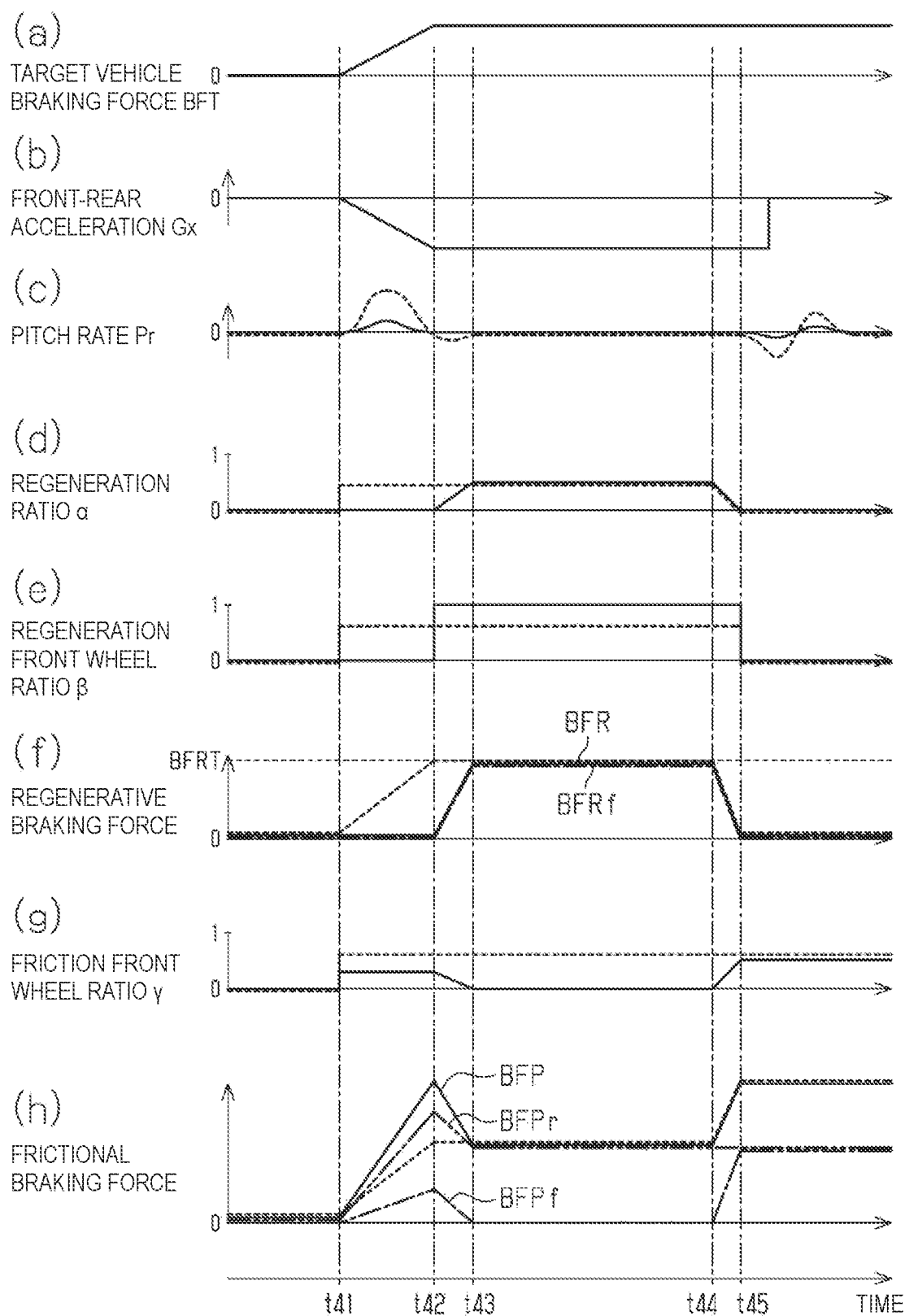
FIG. 7 is a timing chart showing a transition of a braking force applied to the vehicle by the braking control device of the embodiment.

FIG. 7 shows a transition of a braking force applied to the vehicle 90 to which the braking control device 10 of the present embodiment is applied. Note that, in FIGS. 7(c) to 7(h), transitions for a case of the comparative example illustrated in FIGS. 6(c) to 6(h) are indicated by broken lines.

The braking force application process is executed from timing t41 when the braking is started. When the braking force application process is executed, in the example illustrated in FIG. 7, the regeneration ratio α is "0" as indicated by a solid line in FIG. 7(d). As a result, as indicated by a solid line in FIG. 7(f), the regenerative braking force BFR is not applied to the vehicle in the period from timing t41 until timing t42 when the switching process is started. On the other hand, as indicated by a solid line in FIG. 7(h), the frictional braking force BFP is applied to the vehicle in this period.

In the comparative example illustrated in FIG. 6, regenerative braking force and frictional braking force are applied to each of the front wheel 81 and the rear wheel 82. On the other hand, in the example illustrated in FIG. 7, since the regeneration ratio α is "0", only the frictional braking force of the regenerative braking force and the frictional braking force is applied to each of the front wheel 81 and the rear wheel 82. Therefore, the pitching suppression force, which is the sum of the anti-dive force FAD and the anti-lift force FAL, can be made larger than the case of the comparative example illustrated in FIG. 6.

In the example illustrated in FIG. 7, the target vehicle braking force BFT is larger than the limit regeneration value BFRL, and hence the target vehicle braking force BFT is large compared to the example illustrated in FIG. 5. Thus, in the braking force application process in the example illustrated in FIG. 7, the frictional braking force BFP is greatly increased as compared with the example illustrated in FIG. 5.

In the example illustrated in FIG. 7, the output of the posture control priority determination is stopped at timing t42. Therefore, after timing t42, the posture control priority determination is not made (S103: NO) and the regenerative braking force BFR is smaller than the upper limit regenerative braking force BFRT (S106: YES), and thus the regeneration ratio α is increased from timing t42 as indicated by the solid line in FIG. 7(d) (S108). Thus, the switching process from the frictional braking force BFP to the regenerative braking force BFR is executed.

As a result, as indicated by a solid line in FIG. 7(h), the frictional braking force BFP is gradually reduced after timing t42. As indicated by a solid line in FIG. 7(f), the regenerative braking force BFR is gradually increased after timing t42.

In the example illustrated in FIG. 7, since the target vehicle braking force BFT is larger than the limit regeneration value BFRL, the limit regeneration value BFRL is set as the upper limit regenerative braking force BFRT. In the switching process in the example illustrated in FIG. 7, the distribution ratio is derived by the distribution ratio derivation unit 12 so that the difference between the target vehicle braking force BFT and the upper limit regenerative braking force BFRT is compensated by the frictional braking force BFP. As a result, the front wheel frictional braking force BFPf is reduced to "0" at timing t43 as indicated by a one-dot chain line in FIG. 7(h), but the application of the rear wheel frictional braking force BFPr is continued even after timing t43 as indicated by a two-dot chain line. As illustrated in FIG. 7(f), as the regenerative braking force, the rear wheel regenerative braking force BFRr is not applied, and only the front wheel regenerative braking force BFRf indicated by a one-dot chain line is applied.

In a period from timing t44 to timing t45, the regenerative braking force BFR is switched to the frictional braking force BFP by the low-speed switching process. In the present embodiment, the front wheel regenerative braking force BFRf decreases to "0" from timing t44 as in FIG. 7, and instead, the front wheel frictional braking force BFPf increases from the timing t44. On the other hand, since the rear wheel regenerative braking force BFRr is already "0" at timing t44, the braking force of the rear wheel frictional braking force BFPr at timing t44 is maintained even after timing t44.

According to the braking control device 10, the change amount of the posture of the vehicle 90 is predicted to be large in the period from the timing t41 to the timing t42, and hence the braking force is applied to the vehicle 90 so that the frictional braking force BFP increases more than the regenerative braking force BFR. As a result, the pitching suppression force can be increased, and the pitch rate Pr can be suppressed small by such amount as compared with the case of the comparative example of FIG. 6 indicated by the broken line, as indicated by the solid line in FIG. 7(c). That is, a sudden change in the posture of the vehicle can be suppressed.

Furthermore, the distribution ratio is derived such that the rear wheel frictional braking force BFPr and the rear wheel regenerative braking force BFRr increase, so that the anti-lift force FAL can be generated larger as compared with the example illustrated in FIG. 6. This also makes it possible to suppress the pitch rate Pr to be small.

As described above, according to the braking control device 10, even when the target vehicle braking force BFT is large, both suppression of the pitching motion of the vehicle 90 at the time of vehicle braking and improvement of energy recovery efficiency using regeneration can be achieved.

The present embodiment can be modified and implemented as follows. The present embodiment and the following modified examples can be implemented in combination with each other within a technically consistent scope.

As a vehicle on which the braking control device 10 is mounted, the suspension geometry may be set such that the anti-dive force FAD becomes larger than the anti-lift force FAL. In this case, the anti-dive force FAD corresponds to the "first force", and the anti-lift force FAL corresponds to the "second force". The front wheel 81 corresponds to a "first wheel", and the rear wheel 82 corresponds to a "second wheel". In such a vehicle, by applying a larger front wheel braking force than the rear wheel braking force, the pitching motion of the vehicle at the time of vehicle braking can be suppressed, as in the embodiment described above. More specifically, in the braking force application process, the front wheel regenerative braking force BFRf is made larger than the rear wheel regenerative braking force BFRr, so that the pitching suppression force can be increased and furthermore, the pitching motion of the vehicle at the time of vehicle braking can be suppressed.

In the embodiment described above, the example in which the regeneration ratio α derived in the braking force application process is set to "0" has been described. As long as the pitching motion of the vehicle 90 can be suppressed, a part of the frictional braking force BFP applied to the vehicle 90 during the execution of the braking force application process may be applied to the vehicle 90 as the regenerative braking force BFR. That is, the regeneration ratio α in the braking force application process is not limited to "0". For example, the regeneration ratio α can be set in a range smaller than the regeneration ratio in the period from timing t11 to timing t12 in the comparative example of FIG. 4, or the regeneration ratio α can be set in a range smaller than the regeneration ratio in the period from timing t31 to timing t32 in the comparative example of FIG. 6. If the regenerative braking force BFR can be applied even during the execution of the braking force application process, the energy recovery efficiency using regeneration can be further improved.

In the switching process from the frictional braking force BFP to the regenerative braking force BFR, the reduction rate of the frictional braking force BFP during the switching process may be changed. For example, the reduction rate of the frictional braking force BFP can be changed such that the time required to reduce the frictional braking force BFP by the switching process is longer than the time required to increase the frictional braking force BFP by the braking force application process. In this case, even if there is a deviation between the pitching suppression force at the start of the switching process and the pitching suppression force after the end of the switching process, the change in the posture of the vehicle accompanying the execution of the switching process can be easily suppressed.

In the embodiment described above, whether or not the posture change amount becomes greater than or equal to the determination value is determined based on the index related to the pitching motion of the vehicle 90, and when determined that the posture change amount becomes greater than or equal to the determination value, the braking force application process is executed. In addition, when a state in which determination is made that the posture change amount becomes greater than or equal to the determination value is shifted to a state in which determination is made that the posture change amount is smaller than the determination value, the switching process is executed. However, the timing to start the switching process is not limited thereto. For example, in a case where a state in which determination is made that the posture change amount is smaller than the determination value is reached during the execution of the braking force application process, the switching process may be started when the duration of this state reaches a predetermined time.

In addition, for example, the braking force application process may be executed when determination is made that the target vehicle braking force BFT is increased, and the switching process may be executed when the state in which determination is made that the target vehicle braking force BFT is increased is shifted to the state in which determination is made that the target vehicle braking force BFT is not increased.

Furthermore, for example, when the target vehicle braking force BFT starts to be increased, the braking force application process may be executed until elapse of a predetermined time from the time point of the start of increase, and the switching process may be executed after the elapse of the predetermined time.

The braking control device 10 may have a function of executing braking support control of setting the target vehicle braking force BFT and applying the braking force to the vehicle 90 regardless of the operation amount of the braking operation member 92. Even at the time of vehicle braking by the braking support control, both suppression of the pitching motion of the vehicle 90 at the time of vehicle braking and improvement of energy recovery efficiency using regeneration can be achieved by adjusting the distribution ratio similarly to the above embodiment through the execution of the processing routine illustrated in FIG. 3.

Some vehicles have a function of adjusting acceleration/deceleration of the vehicle by operating one operation member. The braking control device 10 can also be applied to such a vehicle. In this case, when deceleration is requested on the vehicle by the operation of the operation member, the target vehicle braking force BFT corresponding to the requested value of the deceleration is derived, and the regenerative braking device 60 and the frictional braking device 70 are controlled based on the target vehicle braking force BFT. Even in such a case, the distribution ratio can be adjusted similarly to the above embodiment by executing the processing routine illustrated in FIG. 3. As a result, both suppression of the pitching motion of the vehicle at the time of vehicle braking and improvement of energy recovery efficiency using regeneration can be achieved.

The vehicle 90 in the embodiment described above includes a motor generator 61F for the front wheel 81 and a motor generator 61R for the rear wheel 82, and can apply regenerative braking force to the front wheel 81 and the rear wheel 82. The vehicle to which the braking control device 10 is applied may include a regenerative braking device that applies regenerative braking force to at least one of the front wheel 81 and the rear wheel 82.

The invention claimed is:

1. A braking control device applied to a vehicle including a regenerative braking device that adjusts a regenerative braking force applied to a wheel of the vehicle and a frictional braking device that adjusts a frictional braking force applied to the wheel, the braking control device comprising:
   processing circuitry configured to:
   derive a target vehicle braking force that is a target value of a braking force applied to the vehicle; and
   control the regenerative braking device and the frictional braking device based on the target vehicle braking force; wherein in controlling the regenerative braking device and the frictional braking device, the processing circuitry executes:
   a braking force application process of increasing the frictional braking force applied to the wheel so that the frictional braking force applied to the wheel becomes larger than the regenerative braking force applied to the wheel when the target vehicle braking force is increased, and
   a switching process of increasing the regenerative braking force applied to the wheel by switching at least a part of the frictional braking force applied to the wheel to the regenerative braking force after the execution of the braking force application process.

2. The braking control device according to claim 1, wherein the processing circuitry is further configured to:
   determine whether or not a posture change amount becomes greater than or equal to a determination value based on an index related to a pitching motion of the vehicle, the posture change amount being a change amount of a posture of the vehicle based on the posture of the vehicle before the start of the increase of the target vehicle braking force; and
   execute the braking force application process when it is determined that that the posture change amount is greater than or equal to the determination value, and end the braking force application process and execute the switching process when it is determined that that the posture change amount is less than the determination value during the execution of the braking force application process.

3. The braking control device according to claim 2, wherein a predicted value of front-rear acceleration of the vehicle or a predicted value of a pitch angular velocity of the vehicle is used as an index representing motion of the vehicle.

4. The braking control device according to claim 3, wherein the processing circuitry is further configured to, assuming an upper limit of regenerative braking force capable of being applied to the vehicle is an upper limit regenerative braking force,
   execute a holding process of holding a ratio of a frictional braking force applied to the wheel of the target vehicle braking force and a ratio of a regenerative braking force applied to the wheel of the target vehicle braking force as a process performed after the execution of the switching process; and
   reduce the frictional braking force applied to the wheel and increase the regenerative braking force applied to the wheel by executing the switching process until the regenerative braking force applied to the vehicle reaches the upper limit regenerative braking force, and terminate the switching process and execute the holding process when the regenerative braking force applied to the vehicle reaches the upper limit regenerative braking force.

5. The braking control device according to claim 4, wherein the vehicle generates an anti-dive force that is a force for displacing a front portion of the vehicle upward when a braking force is applied to a front wheel, and generates an anti-lift force that is a force for displacing a rear portion of the vehicle downward when a braking force is applied to a rear wheel, and when the braking force applied to the front wheel and the braking force applied to the rear wheel have a same magnitude with each other, a first force that is one of the anti-dive force and the anti-lift force being larger than a second force that is the other of the anti-dive force and the anti-lift force; and with, among the front wheel and the rear wheel, a wheel that generates the first force in the vehicle by applying a braking force set as a first wheel, and a wheel that generates the second force in the vehicle by applying a braking force set as a second wheel, an increasing speed of the frictional braking force applied to the first wheel is set to be higher than an increasing speed of the frictional braking force applied to the second wheel in the braking force application process.

6. The braking control device according to claim 3, wherein the vehicle generates an anti-dive force that is a force for displacing a front portion of the vehicle upward when a braking force is applied to a front wheel, and generates an anti-lift force that is a force for displacing a rear portion of the vehicle downward when a braking force is applied to a rear wheel, and when the braking force applied to the front wheel and the braking force applied to the rear wheel have a same magnitude with each other, a first force that is one of the anti-dive force and the anti-lift force being larger than a second force that is the other of the anti-dive force and the anti-lift force; and with, among the front wheel and the rear wheel, a wheel that generates the first force in the vehicle by applying a braking force set as a first wheel, and a wheel that generates the second force in the vehicle by applying a braking force set as a second wheel, an increasing speed of the frictional braking force applied to the first wheel is set to be higher than an increasing speed of the frictional braking force applied to the second wheel in the braking force application process.

7. The braking control device according to claim 2, wherein the processing circuitry is further configured to, assuming an upper limit of regenerative braking force capable of being applied to the vehicle is an upper limit regenerative braking force, execute a holding process of holding a ratio of a frictional braking force applied to the wheel of the target vehicle braking force and a ratio of a regenerative braking force applied to the wheel of the target vehicle braking force as a process performed after the execution of the switching process; and reduce the frictional braking force applied to the wheel and increase the regenerative braking force applied to the wheel by executing the switching process until the regenerative braking force applied to the vehicle reaches the upper limit regenerative braking force, and terminate the switching process and execute the holding process when the regenerative braking force applied to the vehicle reaches the upper limit regenerative braking force.

8. The braking control device according to claim 7, wherein the vehicle generates an anti-dive force that is a force for displacing a front portion of the vehicle upward when a braking force is applied to a front wheel, and generates an anti-lift force that is a force for displacing a rear portion of the vehicle downward when a braking force is applied to a rear wheel, and when the braking force applied to the front wheel and the braking force applied to the rear wheel have a same magnitude with each other, a first force that is one of the anti-dive force and the anti-lift force being larger than a second force that is the other of the anti-dive force and the anti-lift force; and with, among the front wheel and the rear wheel, a wheel that generates the first force in the vehicle by applying a braking force set as a first wheel, and a wheel that generates the second force in the vehicle by applying a braking force set as a second wheel, an increasing speed of the frictional braking force applied to the first wheel is set to be higher than an increasing speed of the frictional braking force applied to the second wheel in the braking force application process.

9. The braking control device according to claim 2, wherein the vehicle generates an anti-dive force that is a force for displacing a front portion of the vehicle upward when a braking force is applied to a front wheel, and generates an anti-lift force that is a force for displacing a rear portion of the vehicle downward when a braking force is applied to a rear wheel, and when the braking force applied to the front wheel and the braking force applied to the rear wheel have a same magnitude with each other, a first force that is one of the anti-dive force and the anti-lift force being larger than a second force that is the other of the anti-dive force and the anti-lift force; and with, among the front wheel and the rear wheel, a wheel that generates the first force in the vehicle by applying a braking force set as a first wheel, and a wheel that generates the second force in the vehicle by applying a braking force set as a second wheel, an increasing speed of the frictional braking force applied to the first wheel is set to be higher than an increasing speed of the frictional braking force applied to the second wheel in the braking force application process.

10. The braking control device according to claim 1, wherein the processing circuitry is further configured to, assuming an upper limit of regenerative braking force capable of being applied to the vehicle is an upper limit regenerative braking force, execute a holding process of holding a ratio of a frictional braking force applied to the wheel of the target vehicle braking force and a ratio of a regenerative braking force applied to the wheel of the target vehicle braking force as a process performed after the execution of the switching process; and reduce the frictional braking force applied to the wheel and increase the regenerative braking force applied to the wheel by executing the switching process until the regenerative braking force applied to the vehicle reaches the upper limit regenerative braking force, and terminate the switching process and execute the holding process when the regenerative braking force applied to the vehicle reaches the upper limit regenerative braking force.

11. The braking control device according to claim 10, wherein the vehicle generates an anti-dive force that is a force for displacing a front portion of the vehicle upward when a braking force is applied to a front wheel, and generates an anti-lift force that is a force for displacing a rear portion of the vehicle downward when a braking force is applied to a rear wheel, and when the braking force applied to the front wheel and the braking force applied to the rear wheel have a same magnitude with each other, a first force that is one of the anti-dive force and the anti-lift force being larger than a second force that is the other of the anti-dive force and the anti-lift force; and with, among the front wheel and the rear wheel, a wheel that generates the first force in the vehicle by applying a braking force set as a first wheel, and a wheel that generates the second force in the vehicle by applying a braking force set as a second wheel, an increasing speed of the frictional braking force applied to the first wheel is set to be higher than an increasing speed of the frictional braking force applied to the second wheel in the braking force application process.

12. The braking control device according to claim 1, wherein the vehicle generates an anti-dive force that is a force for displacing a front portion of the vehicle upward when a braking force is applied to a front wheel, and generates an anti-lift force that is a force for displacing a rear portion of the vehicle downward when a braking force is applied to a rear wheel, and when the braking force applied to the front wheel and the braking force applied to the rear wheel have a same magnitude with each other, a first force that is one of the anti-dive force and the anti-lift force being larger than a second force that is the other of the anti-dive force and the anti-lift force; and with, among the front wheel and the rear wheel, a wheel that generates the first force in the vehicle by applying a braking force set as a first wheel, and a wheel that generates the second force in the vehicle by applying a braking force set as a second wheel, an increasing speed of the frictional braking force applied to the first wheel is set to be higher than an increasing speed of the frictional braking force applied to the second wheel in the braking force application process.

\* \* \* \* \*